UNITED STATES PATENT OFFICE.

FRANK N. HASKELL, OF WORCESTER, MASSACHUSETTS.

COATING FOR WIRE-DRAWING.

SPECIFICATION forming part of Letters Patent No. 325,537, dated September 1, 1885.

Application filed January 16, 1885. (No specimens.)

*To all whom it may concern:*

Be it known that I, FRANK N. HASKELL, a citizen of the United States, residing at Worcester, in the county of Worcester and State of Massachusetts, have invented certain new and useful Improvements in the Art or Process of Wire-Drawing; and I do hereby declare that the following is a full, clear, and exact description of the invention, which will enable others skilled in the art to which my invention belongs to make and use the same.

My invention relates to a coating for wire, to be used in drawing wire down to smaller sizes through dies of the ordinary construction in the usual manner, said coating to be applied to the wire previously to and preparatory to its being drawn.

My improved coating or composition for wire-drawing is composed of lime and soda-ash mixed with water until the coating or solution is of the proper consistency or strength to be applied to the wire previous to drawing.

The coating may be prepared or made in the following manner: The lime is first slaked or mixed with water. The soda-ash is also mixed with water until dissolved. Then the lime and soda-ash are mixed together in a proper receptacle, about two parts of lime to one part of soda-ash, a sufficient quantity of water being added to make the coating or solution of the proper consistency to be applied to the wire.

The wire preparatory to being coated should be cleaned in any well-known way and rinsed or washed in hot water. It is then dipped or immersed in the coating prepared in the manner above described, which I prefer to have hot when applied, being heated by a steam-pipe running into the vat or receptacle in which the coating is contained, or in any other suitable manner.

After the coating has been applied to the wire the wire is placed in a drying-house until the coating has become sufficiently dried and hardened on the wire. It is then ready to be drawn through the drawing-dies in the usual manner.

Having described my improved coating for wire-drawing, what I claim as new and of my invention, and desire to secure by Letters Patent, is—

A coating for wire-drawing, composed of lime and soda-ash, substantially as set forth.

FRANK N. HASKELL.

Witnesses:
JOHN C. DEWEY,
F. E. CASSIDY.